United States Patent

Holloway

[15] 3,653,627

[45] Apr. 4, 1972

[54] MIRROR MOUNTING MEANS

[72] Inventor: Homer C. Holloway, 16332 E. Candlelight Drive, Whittier, Calif. 90604

[22] Filed: Jan. 29, 1970

[21] Appl. No.: 6,721

[52] U.S. Cl. ............................... 248/488, 248/201, 248/445
[51] Int. Cl. ............................................................ A47g 1/16
[58] Field of Search .................. 248/201, 445, 454, 460, 475, 248/488; 40/128

[56] References Cited

UNITED STATES PATENTS

| | | | |
|---|---|---|---|
| 1,879,403 | 9/1932 | Monroe | 248/488 |
| 2,636,417 | 4/1953 | Mathews | 248/475 |
| 3,224,715 | 12/1965 | Maggiore | 248/488 X |

FOREIGN PATENTS OR APPLICATIONS

| | | | |
|---|---|---|---|
| 461,574 | 5/1928 | Germany | 248/445 |

*Primary Examiner*—William H. Schultz
*Attorney*—J. Carroll Baisch

[57] ABSTRACT

A mirror mounting device having a support member attachable to a wall and a second member removably attached to an upper end part of the part attachable to a wall, the free ends of said members having transverse flanges turned toward each other for engagement with upper and lower edge portions of a mirror, thereby retaining the mirror in an angular position.

4 Claims, 4 Drawing Figures

48 36 18 30 3 38 3 16 28 50 14 20 22

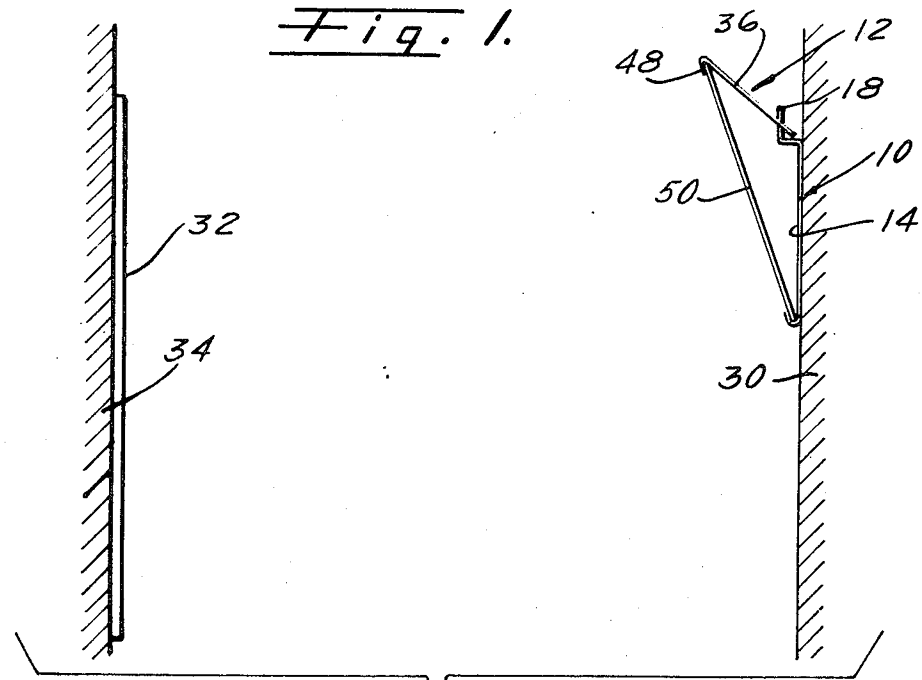
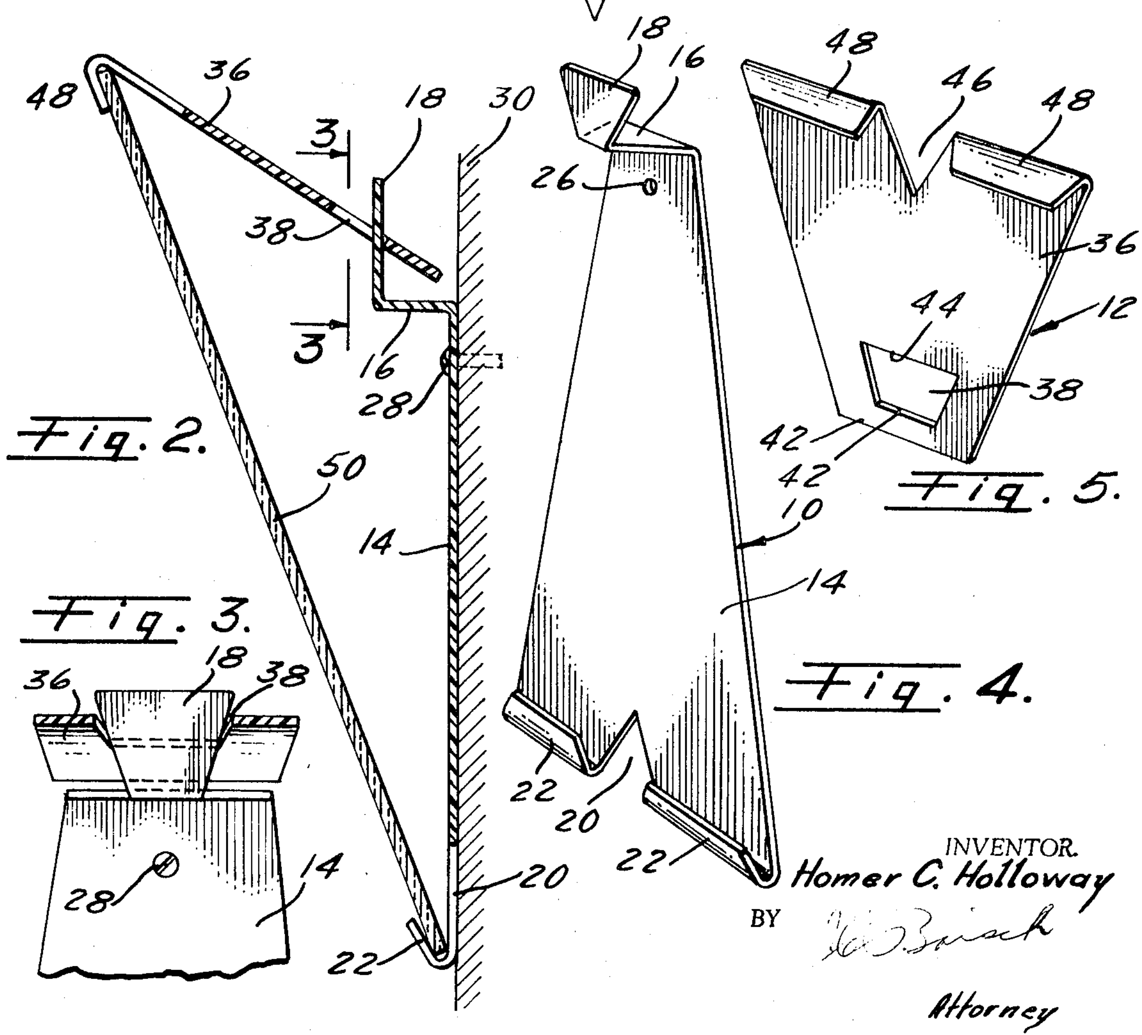
INVENTOR.
Homer C. Holloway
BY
Attorney

MIRROR MOUNTING MEANS

BACKGROUND OF THE INVENTION

1. Field of the Invention. This invention relates generally to mirror mounting apparatus and relates more particularly to mirror mounting means adapted to mount a mirror on a wall or other support in such relation to a main mirror, such as a bathroom mirror, as substantially behind the head of a person using the main mirror so that such person may view both front and back portions of his head to facilitate making up the hair.

2. Description of the Prior Art. Various auxiliary mirror devices have been proposed for use with a main mirror, whereby a person may view both front and back portions of his head to facilitate hair dressing, makeup, and other general cosmetic procedures.

Such devices of which I am aware are relatively complicated, costly and, generally, require adjustment each time they are used.

SUMMARY OF THE INVENTION

The present invention comprises a support member, easily and quickly attachable to a wall opposite a main mirror, and having a tongue at the upper end spaced from the wall. A second member is provided with an opening in which the tongue is removably received, the tongue retaining the second member for movement thereon. The members have transversely extending tongues turned toward each other for engagement with horizontal top and bottom edge portions of an auxiliary mirror to hold said mirror in an upwardly and outwardly inclined angle, the position angle of the auxiliary mirror relative to the main mirror being such that a person using the main mirror may see the back of his head as reflected by the auxiliary mirror into the main mirror.

OBJECTS AND ADVANTAGES OF THE INVENTION

The present invention has for an important object the provision of a mirror mount that is simple in construction and easy to install.

It is another object of the invention to provide a mirror mount that comprises a minimum number of parts or members.

It is still another object of the invention to provide a mirror mount of this character that is relatively inexpensive.

A further object of the invention is the provision of a device or apparatus of this character that securely holds a mirror in position.

A still further object of the invention is to provide a device of this character which permits easy and quick removal of the mirror for cleaning and/or replacement, as well as easy and quick installation of the mirror.

Another object of the invention is to provide a device of this character which does not require adjustments or readjustments of the mirror once it has been installed at the desired location and with the required angular position for use.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a side elevational view of the invention mounted on a wall opposite a main mirror and holding an auxiliary mirror in operable relationship to said main mirror;

FIG. 2 is an enlarged vertical sectional view through the invention;

FIG. 3 is a sectional view taken on line 3—3 of FIG. 2;

FIG. 4 is an enlarged perspective view of the member of the device which is directly attached to supporting means, such as a wall; and FIG. 5 is an enlarged perspective view of the other member of the device.

DESCRIPTION OF THE PREFERRED EMBODIMENT

Referring to the drawings, the device or apparatus comprises a primary support member, indicated generally at 10, and a secondary member, indicated generally at 12. These members may be of any suitable sheet material. For example, they may be of any well-known rigid plastic, such as polyethylene.

The primary support member 10 comprises a body 14 of generally triangular shape, although it may be of any other suitable shape. The smaller end of the body has a forwardly projecting flange 16 with a dovetailed part 18 upstanding from the forward end of said flange 16, said dovetailed part 18 and flange 16 being integral with the body 14. The dovetailed part 18 is spaced forwardly of the plane of the body 14 of the primary member and substantially parallel, therewith, and is narrowest at its junction with the flange 16, the free end of said dovetailed part being widest at its free end.

There is a notch 20 in the wide end or base of the body. The body has upturned flanges 22 at each side of the notch, said flanges being turned upwardly and being spaced from the adjacent part of the body. In other words, the flanges 22 are turned back relative to the body 14 but are spaced from the front side thereof. While the body has the notch 20 and flanges 22, it is to be understood that the notch may be eliminated and a continuous flange provided at the lower end of the body, or there may be a plurality of flanges at the lower end of the body without the notch 20.

Means is provided for attaching the primary member 10 to a support therefor. For example, the body 14 has an opening 26 adjacent the upper end and below the flange 16 for a screw 28 or the like which is screwed or driven into the support which is shown here as a wall 30 opposite a main mirror 32 attached to a wall or the like 34.

Secondary member 12 is, also, of a generally triangular shape and has a body 36 with an opening 38 therein, the opening being narrower at what is termed herein its outer end 40 adjacent the narrower end 42 of the body 36. Its opposite or inner end 44 of the opening 38 is wider than end 40.

Body 36 of the secondary member has a notch 46 in its wider end and at each side of the notch 46 edge portions of the body are turned back and forwardly of the body to provide mirror engaging flanges 48. The notch 46 may be omitted and the flanges 48 may be spaced apart or there may be a continuous flange across this end of the body 36.

A mirror 50, which is termed herein an auxiliary mirror, is held in the proper position by the members 10 and 12.

When installing the auxiliary mirror, the primary support member 10 is secured to the wall 30 by means of the screw 28. The secondary support member 12 is then attached to the primary member by insertion of the dovetail part 18 in the opening 38 of the secondary member 12. The opening 38 is large enough to receive the dovetail part 18 but the narrower end 40 of the opening is of less length than the free end of the part 18, so that when the member 12 is in its operative or mirror holding position said member 12 cannot come off the part 18 of the primary member.

The lower edge of the auxiliary mirror 50 is placed in the space defined by the flanges 22 and adjacent part of the body 14 of the primary member, while the secondary member is swung downwardly so that an upper edge portion of the auxiliary mirror is disposed in the space between the flanges 48 and the adjacent part of the body 36 of the secondary member. Thus, the auxiliary mirror is securely held in position.

The auxiliary mirror 50 is so positioned, relative to the main mirror 32 and behind the head of a person using the main mirror, that such person may view both front and back portions of her head to facilitate hair dressing, makeup, wave-setting, hair trimming and any other operations where it is desirable to see both the front and back portions of the head or hair. Also, one using the mirrors may, by merely turning the head a little, be able to see any desired side portion of the head or hair.

The invention and its attendant advantages will be understood from the foregoing description and it will be apparent that various changes may be made in the form, construction and arrangement of the parts of the invention without out departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A mount for a mirror for viewing the back of the user's head by reflection, comprising:

A. a primary member of sheet material adapted to be attached to supporting means and including
  a. a body,
  b. mirror engaging means at the lower end of the body, when the body is attached to supporting means, for supporting a mirror,
  c. and interconnecting means at the upper end of said body;

B. a secondary member of sheet material and including
  a. a body,
  b. connecting means adjacent one end of the secondary member for connection with the interconnecting means of the primary member,
  c. mirror engaging means adjacent the opposite end of the secondary member for supporting engagement with the upper end of a mirror;

C. the interconnecting means at the upper end of said primary body comprising a dovetail part of said body in spaced relation to the plane of the body of said primary member, said dovetail part being wider at its free end; and the connecting means of the secondary member comprising an opening in the body of said secondary member, said opening being narrower at its outer end that at its inner end and adapted to receive the dovetail part of the primary body, the outer end of said opening being narrower than the wider end of the dovetail part.

2. A mount for a mirror for viewing the back of the user's head by reflection, comprising:

A. a primary member of sheet material adapted to be attached to supporting means and including:
  a. a body,
  b. mirror engaging means at the lower end of the body, when the body is attached to supporting means, for supporting a mirror,
  c. and interconnecting means at the upper end of said body;

B. a secondary member of sheet material and
  a. a body,
  b. connecting means adjacent one end of the secondary member for connection with the interconnecting means of the primary member,
  c. mirror engaging means adjacent the opposite end of the secondary member for supporting engagement with the upper end of a mirror;

C. the mirror supporting means of the primary member comprising flange means integral with the body of the primary member and at the front side thereof, said flange means being spaced from the adjacent part of the body of said primary member and defining with the adjacent part of said body a space for reception of a lower part of a mirror; the mirror engaging means of the secondary body comprising flange means integral with the body of said secondary member, said flange means being spaced from the adjacent part of the body of said secondary member and defining with the adjacent part of the body of said secondary member a space for reception of an upper part of said mirror;

D. the interconnecting means at the upper end of the body of the primary member comprising an upstanding dovetail part integral with the body of said primary member and spaced forwardly of the plane of the body of said primary member, said dovetailed part being wider at its upper free end than at its lower end; and the connecting means of the secondary member comprising an opening in the body of said secondary member, said opening being narrower at its outer end than at its inner end and adapted to receive the dovetail part of the body of the primary member, the outer end of said opening being narrower than the wider free end of the dovetail part of the body of the primary member.

3. The invention defined by claim 2, including means for securing the primary member to supporting means.

4. The invention defined by claim 2, in combination with a mirror held in position by the flanges of said primary member and secondary member.

* * * * *